US012600131B2

(12) United States Patent
Kitani

(10) Patent No.: US 12,600,131 B2
(45) Date of Patent: Apr. 14, 2026

(54) METHOD FOR MANUFACTURING LIQUID EJECTION CHIP AND LIQUID EJECTION CHIP

(71) Applicant: CANON KABUSHIKI KAISHA, Tokyo (JP)

(72) Inventor: Koji Kitani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 18/346,974

(22) Filed: Jul. 5, 2023

(65) Prior Publication Data

US 2024/0051297 A1 Feb. 15, 2024

(30) Foreign Application Priority Data

Aug. 15, 2022 (JP) ................................ 2022-129342

(51) Int. Cl.
*B41J 2/16* (2006.01)
*B41J 2/14* (2006.01)

(52) U.S. Cl.
CPC ............... *B41J 2/1603* (2013.01); *B41J 2/14* (2013.01); *B41J 2/1637* (2013.01)

(58) Field of Classification Search
CPC . B41J 2/1603; B41J 2/14; B41J 2/1637; B41J 2/1404; B41J 2/14145; B41J 2/1623; B41J 2/1628; B41J 2/1629
See application file for complete search history.

(56) References Cited

U.S. PATENT DOCUMENTS

2018/0086064 A1* 3/2018 Kimura ................. B41J 2/1623

FOREIGN PATENT DOCUMENTS

JP 2008-246715 A 10/2008

* cited by examiner

*Primary Examiner* — Lisa Solomon
(74) *Attorney, Agent, or Firm* — Venable LLP

(57) ABSTRACT

A technique capable of ensuring a sealing property between channels even with downsizing is to be provided. A method for manufacturing a liquid ejection chip equipped with an ejection unit which is configured to be capable of ejecting a plurality of liquids, and a plurality of channels which are configured to separately store the plurality of liquids to be supplied to the ejection unit, includes: filling a molten resin into a mold into which a substrate in which the ejection unit is installed on one surface and a groove and a protrusion for forming the channels are formed on the other surface is loaded, and curing the molten resin, thereby forming a resin member on the protrusion with the molten resin, the resin member forming a partition separating a space within the channels adjacent to each other.

8 Claims, 10 Drawing Sheets

METHOD FOR MANUFACTURING LIQUID EJECTION CHIP AND LIQUID EJECTION CHIP

BACKGROUND OF THE INVENTION

Field of the Invention

The present invention relates to a method for manufacturing a liquid ejection chip and to a liquid ejection chip used for a liquid ejection head that can be widely applied as a recording head capable of ejecting ink by an inkjet system, for example.

DESCRIPTION OF THE RELATED ART

Liquid ejection heads are equipped with, for example, a liquid ejection chip, on which ejection pressure generating elements, channels, ejection ports for ejecting liquid, etc., are formed, and a support member, which is equipped with a supply path for supplying liquid to the liquid ejection chip. Japanese Patent Laid-Open No. 2008-246715 discloses a technique in which a liquid ejection chip equipped with a channel for storing ink supplied from a support member and a channel for guiding the ink stored in the channel to an ejection port is configured by laminating and bonding multiple plates.

By the way, since recording apparatuses of a serial scan system or the like reciprocally move a recording head that ejects ink, downsizing of the recording head is required for suppressing the power consumption. However, in the technique disclosed in Japanese Patent Laid-Open No. 2008-246715, with further miniaturization of the configurations due to downsizing of the recording head, the intervals of the channels in the liquid ejection chip which are installed for the respective types of ink are narrowed. Accordingly, the bonded portions between adjacent channels are narrowed, and thus there is a possibility of losing the sealing property between the channels, which may result in color mixture of ink.

SUMMARY OF THE INVENTION

The present invention has been made in view of the above-described problem, so as to provide a technique capable of ensuring the sealing property between channels even with downsizing.

In the first aspect of the present invention, there is provided a method for manufacturing a liquid ejection chip equipped with an ejection unit which is configured to be capable of ejecting a plurality of liquids, and a plurality of channels which are configured to separately store the plurality of liquids to be supplied to the ejection unit, the method including:

filling a molten resin into a mold into which a substrate in which the ejection unit is installed on one surface and a groove and a protrusion for forming the channels are formed on the other surface is loaded, and curing the molten resin, thereby forming a resin member on the protrusion with the molten resin, the resin member forming a partition separating a space within the channels adjacent to each other.

In the second aspect of the present invention, there is provided a liquid ejection chip in which an ejection port that ejects a plurality of liquids is formed on one surface and a partition configuring a plurality of channels that store the plurality of liquids to be supplied to the ejection port is formed on the other side, wherein the partition is configured by adjoining a protrusion part of a substrate and a resin, and wherein, in the partition, a distance of a joint portion in which the resin and the substrate are adjoined to each other is longer than a straight line connecting both edges of the joint portion.

According to the present invention, the sealing property between configurations can be ensured even with downsizing.

Further features of the present invention will become apparent from the following description of exemplary embodiments with reference to the attached drawings.

DESCRIPTION OF THE EMBODIMENTS

Figure 1A:
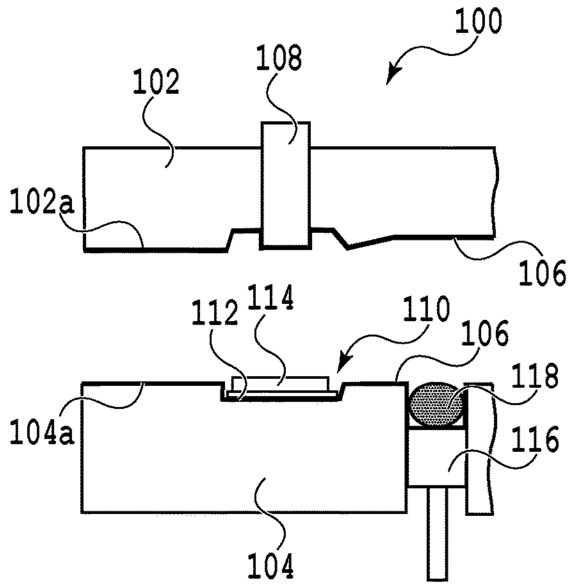
FIG. 1A to FIG. 1D are diagrams for explaining transfer molding.

Hereinafter, with reference to the accompanying drawings, detailed explanations are given of examples of an embodiment of the method for manufacturing a liquid ejection chip. Note that the following embodiments are not intended to limit the present invention, and every combination of the characteristics explained in the present embodiments is not necessarily essential to the solution in the present invention. Further, the positions, shapes, etc., of the constituent elements described in the embodiments are merely examples and are not intended to limit this invention to the range of the examples.

First Embodiment

First, with reference to FIG. 1A to FIG. 5C, an explanation is given of the method for manufacturing a liquid ejection chip according to the first embodiment.

(Molding Method)

In the present embodiment, the liquid ejection chip, which configures a liquid ejection head together with a support member, is manufactured by a transfer molding method. The transfer molding method is a molding method in which a substrate is placed in a mold and molten resin is poured through a gate to obtain a formed material including a member formed of the resin on the substrate. That is, the transfer molding method is a molding method in which melting of resin, filling of molten resin, and curing of molten resin are executed in a mold. The transfer molding method is often used for sealing (packaging) of semiconductor elements. Resins used in the transfer molding method are required to have properties such as adhesiveness to semiconductor elements, anti-peeling property against thermal expansion, and anti-permeation property against humidity. As a resin with such properties, for example, an epoxy resin composition configured of an epoxy resin with high adhesiveness, a curing agent, an inorganic filler such as spherical silica with a low thermal expansion ratio, a curing accelerator, etc., is commercially available.

Epoxy resin compositions melt into a liquid state by being heated. Further, at a temperature of about 160° C. to 180° C., epoxy resin compositions begin to melt and then gel due to bridge bond of the molecules, so that the viscosity increases and the curing proceeds. Therefore, in the transfer molding method, a void portion (hereinafter also referred to as a "cavity portion"), which serves as a mold for molding a formed material, is filled with a molten epoxy resin composition before gelation begins. After the filling, the epoxy resin composition is cured under predetermined curing conditions (e.g., temperature for molding, several tens of seconds to several minutes (curing time)). Thereafter, the formed material is taken out of the mold, and the epoxy resin composition is post-cured (after-curing) under predetermined post-curing conditions (e.g., temperature for molding, several hours).

Although thermosetting resins such as epoxy resin and phenol resin have low melt viscosities and thus fine shapes can be reproduced, there is a possibility that the molded resin sticks to the mold. Therefore, in a case of using such a resin, cleaning for peeling the resin stuck to the mold from the mold has been necessary after molding a formed material. In recent years, in order to reduce the burden of such cleaning, a technique that uses a fluorine-based resin film in the transfer molding method, with which there is little sticking of the molded resin and which achieves high heat resistance and high strength even with a thin film, has been known. In this technique, a fluorine-based resin film is attached to the molding surface of the mold (the surface that makes contact with the molten resin). Note that, by attaching such a resin film, it is possible to prevent molten resin from flowing into gaps formed in the mold, and thus the degree of freedom in the shape of the mold is increased, so that packaging of a semiconductor element with installation of a non-sealed region such as an aperture portion becomes possible as well.

Figure 1B:
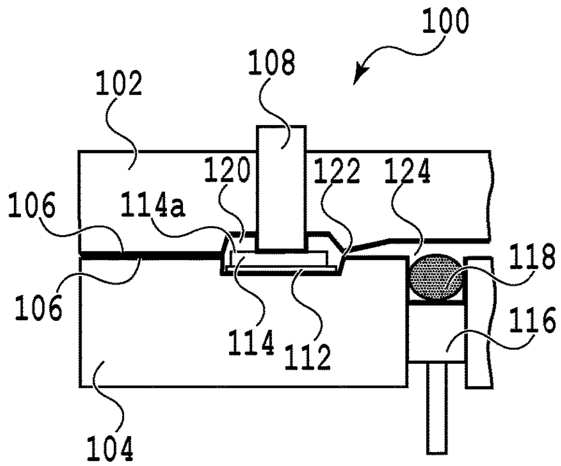
Figure 1C:
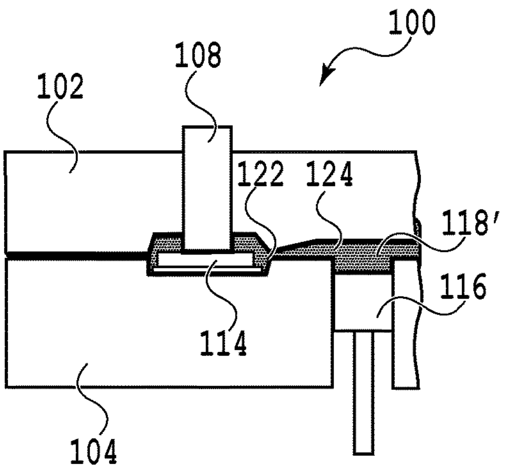
Figure 1D:
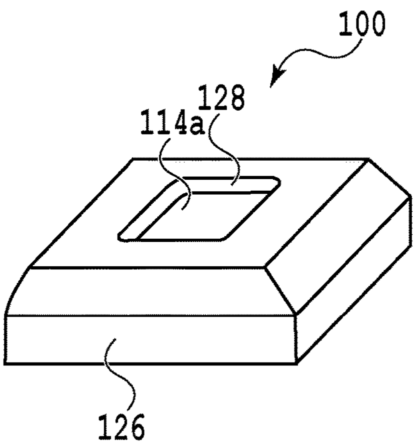

Here, with reference to FIG. 1A to FIG. 1D, an explanation is given of the processing procedure of the transfer molding method for packaging of a semiconductor element with installation of an aperture portion. FIG. 1A to FIG. 1D are diagrams for explaining the processing procedure of the transfer molding method for packaging of a semiconductor element with installation of an aperture portion. FIG. 1A is a diagram illustrating a state in which a semiconductor element (hereinafter also simply referred to as an "element") and a resin tablet are loaded before an upper mold and a lower mold are fastened. FIG. 1B is a diagram illustrating a state in which an upper mold and a lower mold are connected. FIG. 1C is a diagram illustrating a state in which a cavity portion is filled with molten resin. FIG. 1D is a diagram illustrating a formed material in which a semiconductor element is packaged with installation of an aperture portion.

First, the films 106 made of a fluorine-based resin or a PET-based resin are attached to the respective molding surface sides of the upper mold 102 and the lower mold 104, which configure the mold 100 for producing the formed material M (see FIG. 1A). The molding surface of the upper mold 102 is the surface 102*a* facing the lower mold 104, and, for example, the film 106 is attached to the full surface of the surface 102*a*. Further, the molding surface of the lower mold 104 is the surface 104*a* facing the upper mold 102, and, for example, the film 106 is attached to the full surface of the surface 104*a*. The upper mold 102 is equipped with the insert mold 108 that can be pressed against the lower mold 104.

The films 106 have a thickness of 5 to 50 μm, for example. The films 106 are attached to the upper mold 102 and the lower mold 104 by vacuum suction method (not illustrated in the drawings), for example. The films 106 thereby attached prevent the resin from sticking to the molds at the time of molding and also prevent the molten resin from invading gaps between the upper mold 102 and the insert mold 108, so as to prevent the insert mold 108 from sticking to the upper mold 102.

If the attachment of the films 106 is completed, the substrate 112 and the semiconductor element 114 are loaded into the setting portion 110, and the tablet 118 made of a resin material for sealing is loaded into the plunger 116 (see FIG. 1A). The setting portion 110 is formed in the lower mold 104 so as to be located within the cavity portion 120, which is formed inside the mold 100 in a case where the upper mold 102 and the lower mold 104 are fastened. The plunger 116 is formed in the lower mold 104 and configured to be capable of heating and melting the loaded tablet 118. Further, the plunger 116 has a configuration capable of pressurizing a resin in a molten state. In the present embodiment, the plunger 116 as well as the upper mold 102 and the lower mold 104 are configured to be capable of heat application. Therefore, in this configuration, the cavity portion 120 can be filled with the molten resin pressurized by the plunger 116 while the temperature of the molten resin is maintained. The tablet 118 has a size corresponding to the volume of the resin molded portion 126 (see FIG. 1D) of the formed material M, i.e., the volume of the cavity portion 120, in consideration of the volume of the sprue 124 (which is described later).

Then, the upper mold 102 and the lower mold 104 are fastened (see FIG. 1B). Accordingly, the upper mold 102 and the lower mold 104 form the cavity portion 120, the gate portion 122 serving as an inlet port for a resin in a molten state entering the cavity portion 120, and the sprue 124 in which the resin in the molten state is stored. Note that the upper mold 102 and the lower mold 104 have grooves (not illustrated in the drawings) formed in their fastening surfaces (the surface 102*a* and the surface 104*a*), and these grooves allow the cavity portion 120 to communicate with the outside of the mold 100, for example. Accordingly, gas and moisture generated at the time of molding can be discharged from the cavity portion 120 to the outside of the mold 100.

After the upper mold 102 and the lower mold 104 are fastened, next, the insert mold 108 presses the semiconductor element 114 which is set in the setting portion 110. Accordingly, the insert mold 108 is brought into close contact with a predetermined region of the front surface 114*a* of the semiconductor element 114 via the film 106.

Note that, in the explanation using FIG. 1A to FIG. 1D, although the insert mold 108 is configured to be movable in the vertical direction of the drawings in the upper mold 102 and the insert mold 108 is configured to move so as to press the semiconductor element 114, there are not limitations as such. For example, by suppressing variations in the thicknesses of the substrate 112 and the semiconductor element 114, the insert mold 108 may be formed integrally with the upper mold 102, and the elasticity of the film 106 is used for the pressure application so as not to break the semiconductor element 114.

Thereafter, the temperatures of the upper mold 102, the lower mold 104, and the plunger 116 are raised to, for example, 180° C., so as to melt the resin (the tablet 118) in the plunger 116. Then, the plunger 116 pressurizes the molten resin 118' at about 5 MPa and takes about 10 seconds to flow the molten resin 118' into the cavity portion 120 via the sprue 124 and the gate portion 122 (see FIG. 1C). Note that, in order to accelerate the packing and filling speed of the molten resin 118' into the cavity portion 120 and to discharge gas and moisture that cause molding defects, it is also possible to reduce the pressure inside the cavity portion 120 in advance.

If the filling of the molten resin 118' into the cavity portion 120 is completed, next, the upper mold 102, the lower mold 104, and the plunger 116 are maintained at 180° C. for a predetermined time period (cure time), e.g., for about 100 seconds, so that the molten resin 118' is cured. Thereafter, the fastening of the upper mold 102 and the lower mold 104 is released, and the formed material M formed in the cavity portion 120 is taken out. Here, the resin (the cured molten resin 118') remaining around the gate portion 122 and in the grooves for discharging gas and moisture is removed. Regarding the formed material M thus produced, the substrate 112 is located on the bottom face, the resin molded portion 126 is formed from the side surfaces of the substrate 112 and the semiconductor element 114 to the front surface 114*a*, and the front surface 114*a* of the semiconductor element 114 is exposed from the aperture portion 128 of the resin molded portion 126. Thereafter, as required, the formed material M is post-cured for several hours at a temperature of about 180° C., which is a molding temperature, for example.

(Configuration of the Liquid Ejection Chip)

Figure 2A:
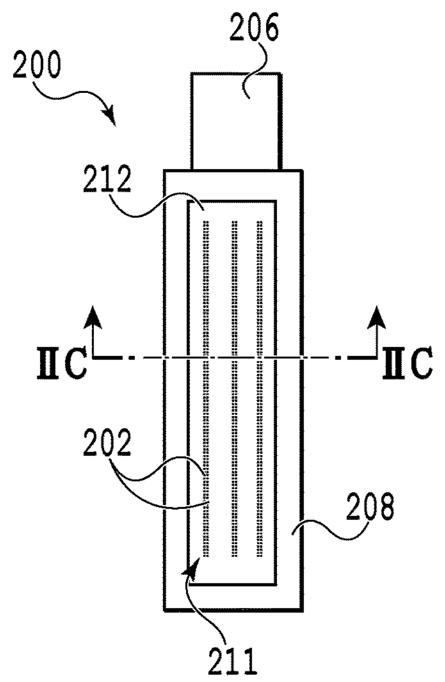
FIG. 2A to FIG. 2D are schematic configuration diagrams of a liquid ejection chip.
Figure 2B:
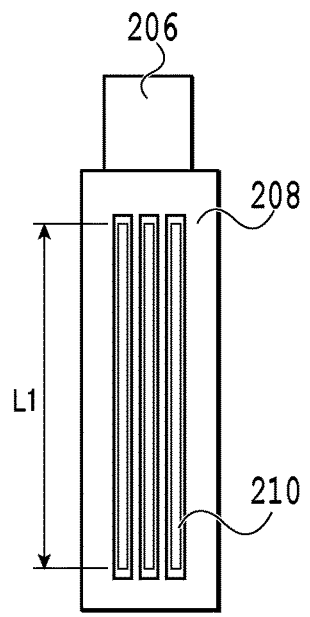
Figure 2C:
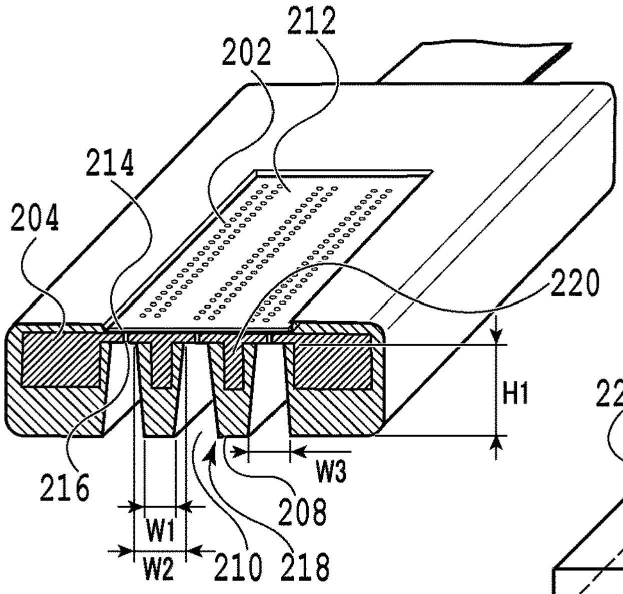
Figure 2D:
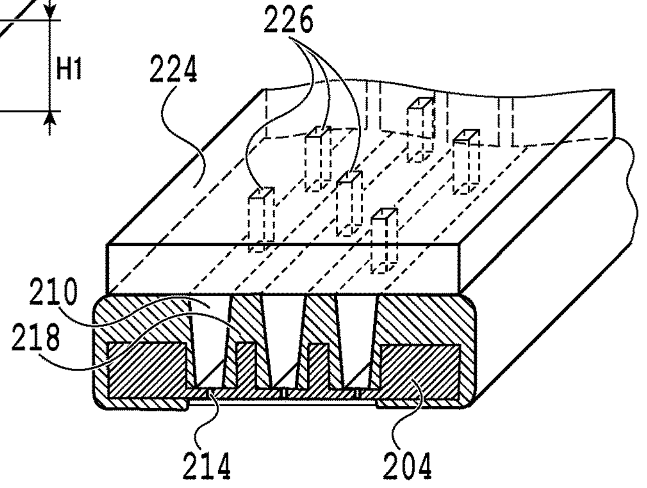
Figure 3A:
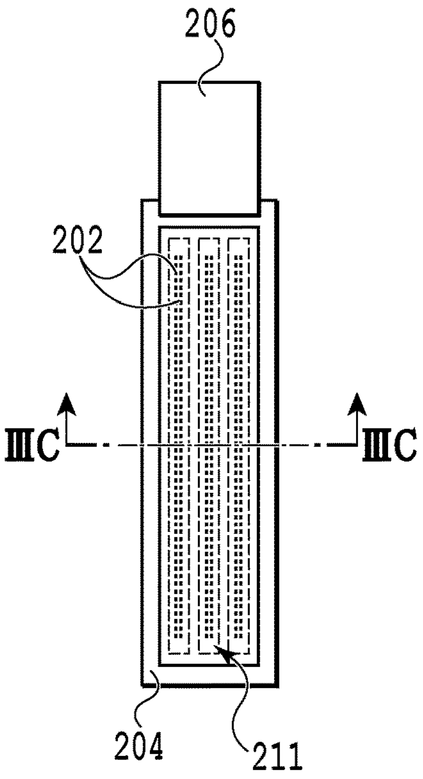
FIG. 3A to FIG. 3C are schematic configuration diagrams of a silicon substrate.
Figure 3B:
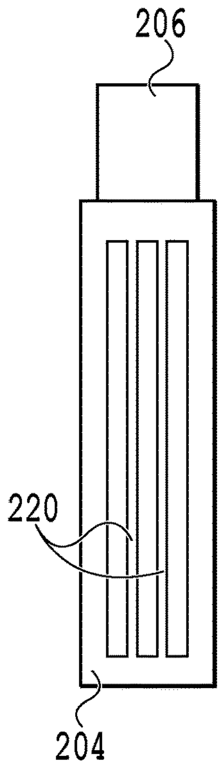
Figure 3C:
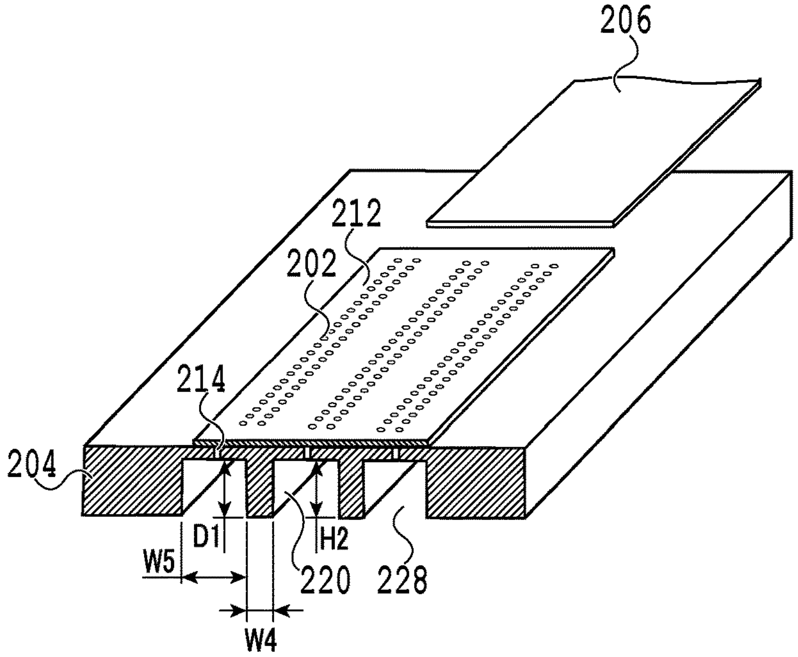

Next, in the present embodiment, an explanation is given of a liquid ejection chip produced by a transfer molding method. The liquid ejection chip is configured to be capable of ejecting multiple different types of liquid. FIG. 2A to FIG. 2D are schematic configuration diagrams of the liquid ejection chip. FIG. 2A is a plan view, FIG. 2B is a bottom view, FIG. 2C is a perspective view of a cross section taken along the line IIC-IIC of FIG. 2A, and FIG. 2D is a cross-sectional perspective view illustrating a state in which a support member on which channels for supplying liquid to back surface channels are formed is connected. Note that, FIG. 2D is illustrated upside down as compared with FIG. 2C. FIG. 3A to FIG. 3C are schematic configuration diagrams of a silicon substrate configuring the liquid ejection chip. FIG. 3A is a plan view, FIG. 3B is a bottom view, and FIG. 3C is a perspective view of a cross section taken along the line IIIC-IIIC of FIG. 3A.

The liquid ejection chip 200 to be adjoined to the support member 224 (which is described later) to configure a liquid ejection head includes the ejection port forming layer 212, the silicon substrate 204, the wiring substrate 206, and the resin member 208.

The ejection port forming layer 212 includes the ejection ports 202 for ejecting liquid and channels (not illustrated in the drawings) for guiding the liquid to the ejection ports 202. Further, the silicon substrate 204 is equipped with ejection pressure generating elements (not illustrated in the drawings) that generate energy for ejecting liquid from the ejection ports 202 on one surface, and, on that surface, the silicon substrate 204 is equipped with the ejection port forming layer 212. Here, the ejection pressure generating elements are installed at the positions corresponding to the ejection ports 202 which are installed in the ejection port forming layer 212. The silicon substrate 204 has the grooves 228 and protrusions 220 (which are described later) for forming the back surface channels 210 (which are described later) on the other surface opposite to the one surface. Furthermore, on the bottom faces of the grooves 228, the silicon substrate 204 is equipped with the supply ports 214 (which are described later) that are formed so as to penetrate to the one surface.

The wiring substrate 206 is electrically connected to terminals formed on the one surface of the silicon substrate 204 by a technique such as flip chip. Note that, although illustration in the drawings is omitted, on the one surface of the silicon substrate 204, a drive circuit for driving the ejection pressure generating elements, various wirings, and terminals are installed. Various publicly-known techniques can be used for the method of manufacturing the silicon substrate 204. In the present embodiment, the wiring substrate 206, the ejection port forming layer 212, the ejection pressure generating elements installed on one surface of the silicon substrate 204, and the drive circuit thereof, etc., function as an ejection unit for ejecting liquid.

The liquid ejection chip 200 is produced by adjoining the resin member 208 to the silicon substrate 204, on which the ejection port forming layer 212 and the wiring substrate 206 are attached, by a transfer molding method. On one surface of the liquid ejection chip 200 (hereinafter referred to as the "front surface" as appropriate), the ejection port array 211 in which the multiple ejection ports 202 are arranged side by side for each type of liquid is exposed in the ejection port forming layer 212, and the surroundings are covered with the resin member 208. On the other hand, on the other surface of the liquid ejection chip 200 (hereinafter referred to as the "back surface" as appropriate), only the bottom faces of the grooves 228 formed in the silicon substrate 204 are exposed, and the other regions are covered by the resin member 208. On this back surface, the recessed portions in which the bottom faces of the grooves 228 are exposed are the back surface channels 210 that individually store the respective types of the liquid to be supplied to the ejection ports 202. In the present embodiment, the three back surface channels 210 are formed so as to correspond to the types of liquids. In the silicon substrate 204, the supply ports 214 for supplying the liquids stored in the back surface channels 210 to the ejection port forming layer 212 are located at the positions forming the bottom faces 216 of the back surface channels 210.

The partitions 218 that separate the spaces in the back surface channels 210 adjacent to each other are configured by forming the resin member 208 on the protrusions (on the protrusions 220) formed on the other surface of the silicon substrate 204. Note that the "spaces in the back surface channels 210" indicate the spaces of the back surface channels 210 in which liquid can be stored. Here, on the other surface of the silicon substrate 204, the grooves 228 are formed along the extending direction of the silicon substrate 204 by etching such as the Bosch process. The spaces in the adjacent grooves 228 are separated by the protrusions 220. The grooves 228 have, for example, the depth D1 of 0.4 mm and the width W5 of 0.6 mm. Further, the protrusions 220 have the height H2 of 0.4 mm and the width W4 of 0.2 mm, for example. Furthermore, the partitions 218 configured with the protrusions 220 and the resin member 208 have, for example, the back surface width W1 of 0.35 mm, the height H1 of 1.2 mm, and the bottom face width W2 of 0.5 mm. Further, the back surface channels 210 have the length L1 of 50 mm in the extending direction of the liquid ejection chip 200 and the width W3 of 0.8 mm.

The supply ports 214 are, for example, 0.1 mm square through-holes that communicate with the back surface channels 210 and the ejection port forming layer 212 to guide the liquid in the back surface channels 210 to the ejection ports 202 of the ejection port forming layer 212. The support member 224 is adjoined to the back surface of the liquid ejection chip 200, and a tank (not illustrated in the drawings) is connected to the liquid ejection chip 200 via the support member 224. The common channels 226 to supply the liquid from the tank to the back surface channels 210 are formed in the support member 224.

(Procedure for Producing the Liquid Ejection Chip Using the Transfer Molding Method)

Figure 4A:
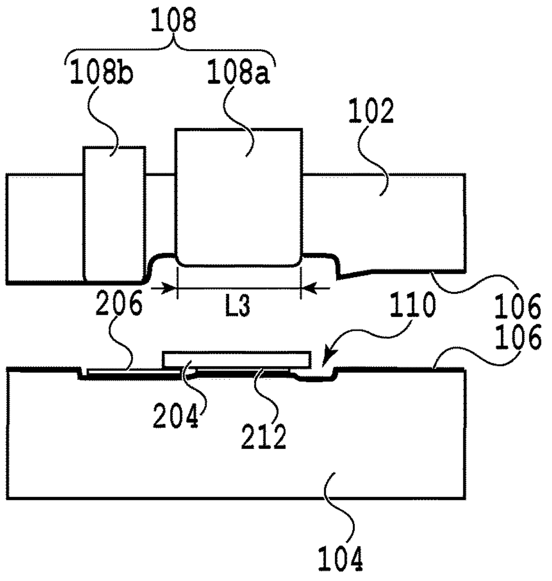
FIG. 4A to FIG. 4D are diagrams for explaining the production of the liquid ejection chip by the transfer molding.
Figure 4B:
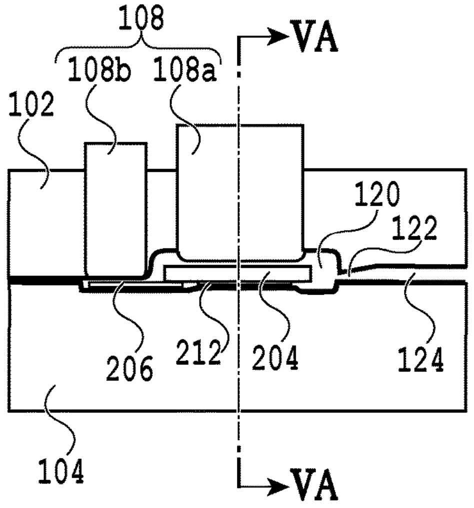
Figure 4C:
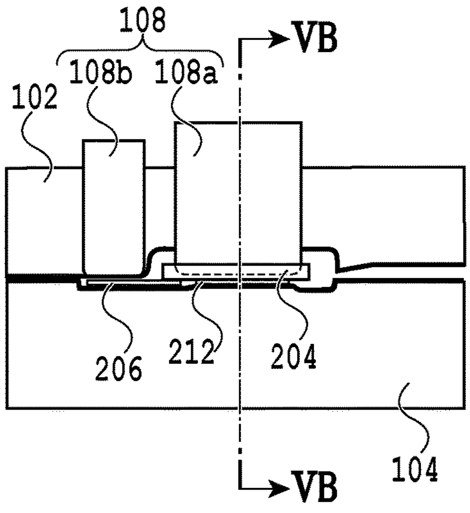
Figure 4D:
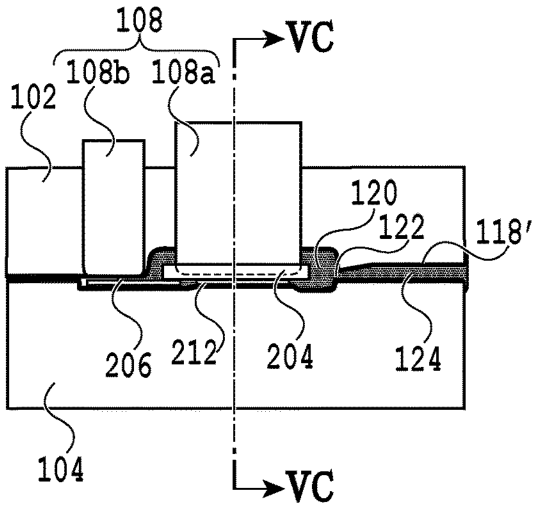
Figures 5A, 5B, 5C:
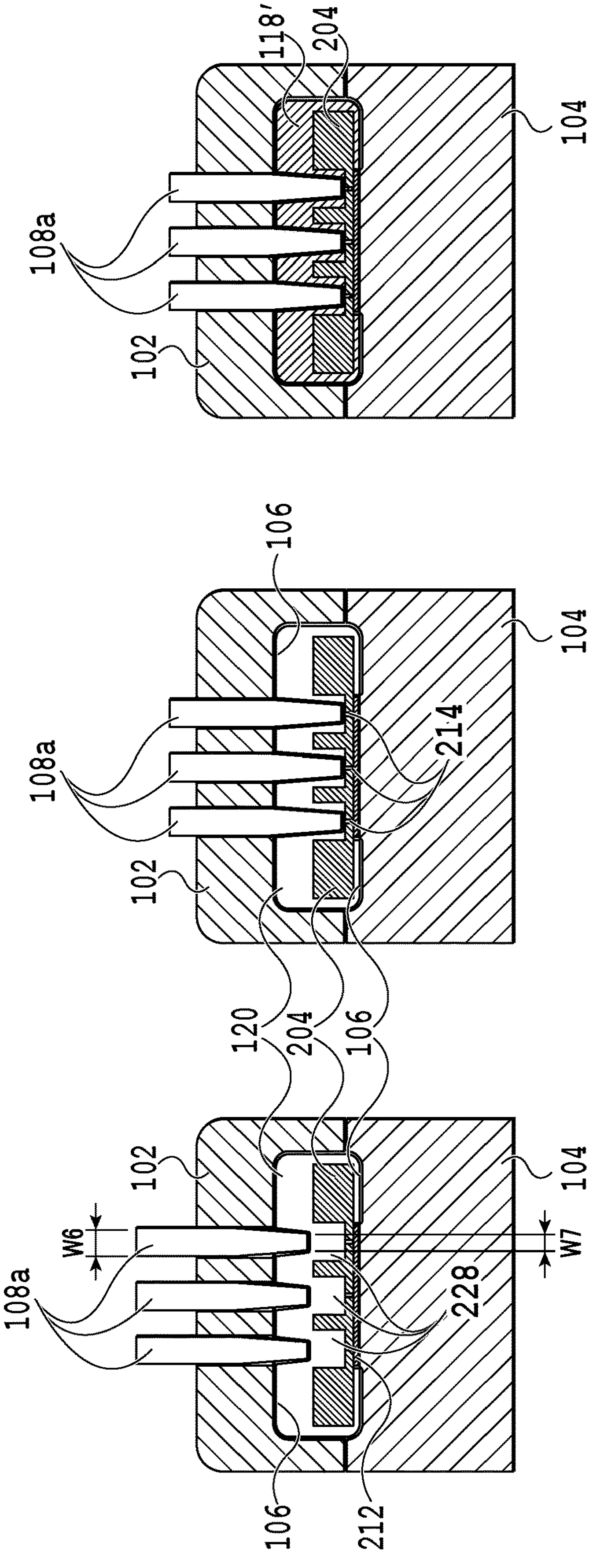
FIG. 5A to FIG. 5C are diagrams for explaining the production of the liquid ejection chip by the transfer molding.

Next, an explanation is given of the procedure for producing the liquid ejection chip 200 by the transfer molding method. FIG. 4A to FIG. 5C are diagrams for explaining the processing procedure for producing the liquid ejection chip 200 by the transfer molding method. Note that, in FIG. 4A to FIG. 5C, the same signs are used for the configurations corresponding to the respective configurations of the mold 100 explained with reference to FIG. 1A to FIG. 1D. FIG. 4A is a diagram illustrating a preparatory state for producing the liquid ejection chip 200. FIG. 4B is a diagram illustrating a state in which the upper mold 102 and the lower mold 104 are fastened. FIG. 4C is a diagram illustrating a state in which the silicon substrate 204 is pressed by the insert mold 108. FIG. 4D is a diagram illustrating a state in which a molten resin is poured into the cavity portion 120. FIG. 5A is a cross-sectional view taken along the line VA-VA of FIG. 4B, FIG. 5B is a cross-sectional view taken along the line VB-VB of FIG. 4C, and FIG. 5C is a cross-sectional view taken along the line VC-VC of FIG. 4D.

For producing the liquid ejection chip 200 using the transfer molding method, first, the silicon substrate 204 to which the wiring substrate 206 and the ejection port forming layer 212 are attached is loaded into the setting portion 110 of the lower mold 104 to which the film 106 is attached (See FIG. 4A). The silicon substrate 204 is positioned and loaded in the setting portion 110 with accuracy of ±0.02 mm or less, for example. The film 106 is formed of, for example, ethylene-tetrafluoroethylene copolymer (ETFE) resin and has a thickness of, for example, 0.05 mm. ETFE resin is a type of fluorine-based resin and can suppress the occurrence of sticking of the cured molten resin 118', and the elongation percentage that incurs fracture is as large as 500% or more, so that fracture caused by elongation at the time of pressing the insert mold 108 is unlikely to occur.

Note that the insert mold 108 is equipped with the insert molds 108*a* and the insert mold 108*b*. The insert molds 108*a* are arranged so as to be capable of pressing the silicon substrate 204 loaded in the setting portion 110. Further, the insert mold 108*b* is arranged so as to be capable of pressing the wiring substrate 206 loaded in the setting portion 110. The insert molds 108*a* and the insert mold 108*b* are capable of individually pressing the targets. Note that the film 106 is also attached to the upper mold 102. Further, although illustration in the drawings is omitted, in the plunger 116, the tablet 118 made of an epoxy resin composition is loaded. In the present embodiment, CV-8710U manufactured by Panasonic Corporation was used as the epoxy resin composition.

Next, the upper mold 102 and the lower mold 104 are fastened (see FIG. 4B and FIG. 5A). Thereby, the gate portion 122, the sprue 124, and the cavity portion 120 are formed. Here, the insert molds 108*a* are located at the positions facing the respective grooves 228 in the silicon substrate 204. Note that, in the present embodiment, the three insert molds 108*a* are formed at the respective positions corresponding to the grooves 228 (see FIG. 5A). Further, in this configuration, the insert molds 108*a* can be pressed individually.

The insert molds 108*a* are formed of, for example, high-speed steel, and their front surfaces are subjected to hardening processing for wear resistance, such as nitriding processing, and polishing processing. The insert molds 108*a* have, for example, the length L3 of 50 mm and the width W6 of 0.4 mm and have a tapered shape whose width gets gradually smaller as approaching the tip from a predetermined position so that the width W7 of the tip is 0.2 mm and the draft angle is 3.5 degrees. The tips of the insert molds 108*a* are R-chamfered.

If the upper mold 102 and the lower mold 104 are fastened, next, the bottom faces of the grooves 228 of the silicon substrate 204 are pressed by the insert molds 108*a*, and the wiring substrate 206 is pressed by the insert mold 108*b*. Thus, in the present embodiment, the insert molds 108*a* function as a pressing portion that presses the bottom faces of the grooves 228. Note that the pressing with the insert molds 108 is maintained, for example, until the molten resin is cured. Here, since the tips of the insert molds 108*a* are R-chamfered, the film 106 is less likely to be damaged at the time of pressing the bottom faces of the grooves 228. Note that, although the film 106 is expanded and thinned by the movement of the insert molds 108*a* at the time of the pressing, the amount of expansion can be adjusted to some extent by the relative protruding positions of the insert molds 108*a* with respect to the upper mold 102 at the time of attaching the film 106. That is, the above-described protruding positions are adjusted so as not to damage the film 106 at the time of the pressing with the insert molds 108*a* due to the film 106 becoming too thin.

Further, regarding the bottom faces of the grooves 228, the supply ports 214 are located in the regions that are pressed by the insert molds 108*a* via the film 106. Therefore, on the bottom faces of the grooves 228, the regions including the supply ports 214 are sealed with the film 106. These sealed regions are the bottom faces 216 of the back surface channels 210. Note that the film 106 is thinned by the pressing with the insert molds 108*a*, and thus the elastic deformation amount is reduced. Therefore, for sealing the regions including the supply ports 214 in the present step, it is necessary to pay attention to how the gaps are formed, i.e., the regions to be sealed change, depending on the thickness of the film 106. That is, in order to ensure the thicknesses of the tip portions of the insert molds 108*a* at the time of the pressing so that the target regions can be reliably sealed, the protruding positions of the insert molds 108*a* at the time of attaching the film 106 are to be adjusted, for example.

By the pressing with the insert molds 108*a*, the predetermined regions of the ejection port forming layer 212 in which the ejection ports 202 are formed is brought into a close contact, via the silicon substrate 204, with the film 106 attached to the lower mold 104. That is, by the pressing, the predetermined regions of the ejection port forming layer 212 in which the ejection ports 202 are formed are sealed with the film 106 attached to the lower mold 104. Further, by the pressing with the insert mold 108*b*, a part of the wiring substrate 206 on the other surface is sealed with the film 106 attached to the upper mold 102, and one surface thereof is sealed with the film 106 attached to the lower mold 104.

Thereafter, the upper mold 102, the lower mold 104, and the plunger 116 are heated to 180° C., so as to melt the tablet 118, and the molten resin 118' is pressurized at 5 MPa, so that the cavity portion 120 is filled with the molten resin 118' over a period of time about 10 seconds (see FIG. 4D and FIG. 5C). Here, even by the pressing with the insert mold 108, the regions sealed with the films 106 are not brought into contact with the molten resin 118'. If the filling of the cavity portion 120 with the molten resin 118' is completed, next, while maintaining the temperature at 180° C., the molten resin 118' is cured over a period of time about 70 seconds. Thereafter, the fastening of the upper mold 102 and the lower mold 104 is released, and the formed material M is taken out. The formed material M that has been taken out is subjected to processing such as post-curing under predetermined conditions, as required. Further, since resin remains inside the upper mold 102 and the lower mold 104 via the film 106, such residual resin is removed.

As explained above, in the present embodiment, the resin member 208 is formed by the transfer molding on the protrusions 220 installed on the silicon substrate 204, and thus the partitions 218 separating the spaces in the adjacent back surface channels 210 are formed. Accordingly, even if the liquid stored in the back surface channels 210 invades the joint surfaces between the protrusions and the resin member 208, the invading liquid cannot easily reach the adjacent back surface channels 210 due to the protrusions 220 for the invading liquid to get over.

Second Embodiment

Next, with reference to FIG. 6A to FIG. 8B, an explanation is given of a method for manufacturing a liquid ejection chip according to the second embodiment. Note that, in the following explanation, the same or corresponding configurations as those in the explanation of the above-described first embodiment are assigned with the same signs as those used in the first embodiment, so as to omit the detailed explanations thereof.

The second embodiment is different from the above-described first embodiment in an aspect that the widths of the grooves in the silicon substrate gradually narrow from the upstream side toward the downstream side in the direction of filling the cavity portion 120 with the molten resin 118'. In other words, in the present embodiment, the widths of the protrusions separating the spaces in the grooves of the silicon substrate gradually widen from the upstream side toward the downstream side in the above-described filling direction. Note that, in the present specification, the filling direction of the molten resin indicates the direction in which the molten resin flows into the cavity portion at the time of filling the cavity portion with the molten resin.

Figure 6:
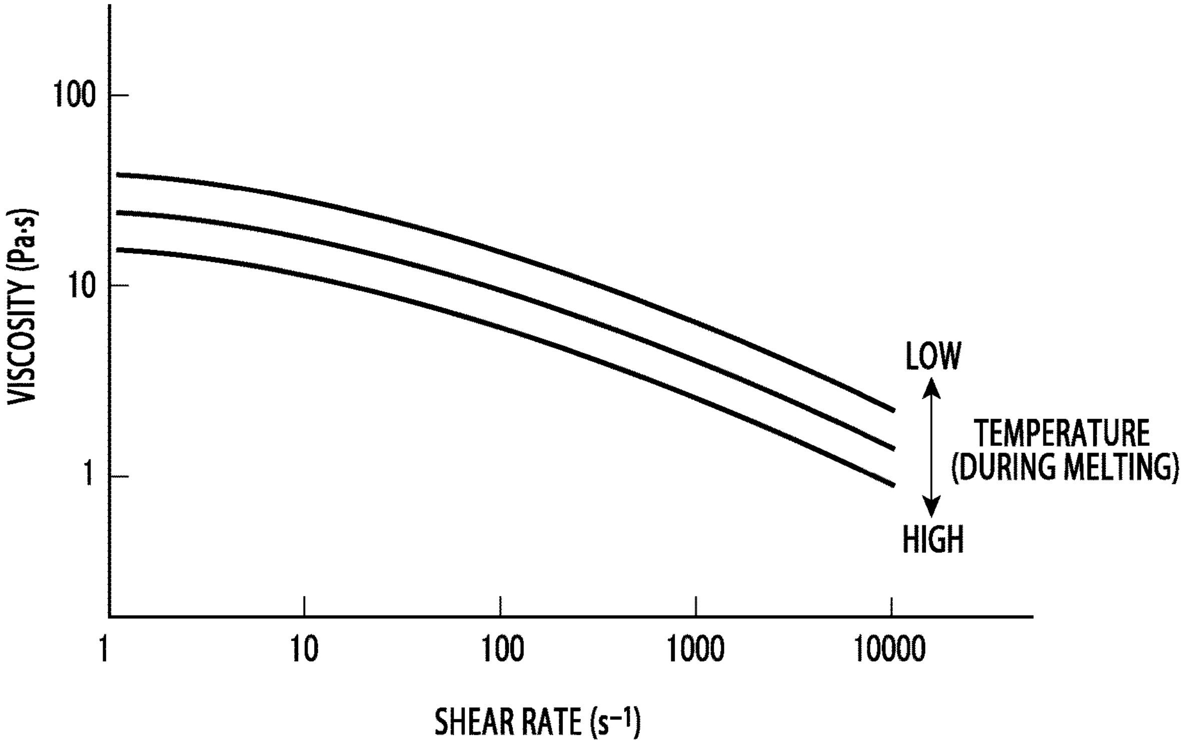
FIG. 6 is a graph illustrating viscosity change corresponding to shear rate of an epoxy resin composition.

Here, an explanation is given of viscosity of the epoxy resin composition. FIG. 6 is a conceptual graph of viscosity change corresponding to shear rate for the epoxy resin composition used in the transfer molding method. The viscosity of the epoxy resin composition at the time of molding, i.e., in the molten state, is about 1 to 100 Pa·s, which is lower by two orders of magnitude or more, compared to the viscosity of general thermoplastic resins at the time of molding. Therefore, even a narrow portion can be easily filled with the epoxy resin composition in the molten state, which is suitable for molding a fine shape such as a thin portion.

Further, as illustrated in FIG. 6, the epoxy resin composition has a characteristic that the viscosity becomes lower with increase in temperature for melting and the viscosity becomes lower with increase in shear rate. Note that, as the temperature for melting becomes higher, the time period until the start of the gelation of the epoxy resin composition also becomes shorter. In the transfer molding method, the viscosity of the epoxy resin composition in the molten state is reduced in order to mold fine shapes. Specific methods for reducing the viscosity of the epoxy resin composition in the molten state include increasing the molding temperature and increasing the shear rate.

If the molding temperature is raised, the time period until the start of the gelation is shortened, and, as a result of such gelation, there is a possibility that a narrow portion or the like is not properly filled with the epoxy resin composition in the molten state, and thus it is not necessarily suitable that the molding temperature is high. That is, the molding temperature is set within an appropriate range depending on the shape of a void such as a narrow portion to be filled with the epoxy resin composition, the type of epoxy resin composition to be used, etc.

On the other hand, one method of increasing the shear rate is to increase the pressure of filling the cavity portion with the epoxy resin composition. However, in this method, there is a possibility that the elements arranged within the cavity portion are damaged due to the filling pressure of the epoxy resin composition. Another method of increasing the shear rate is to narrow the entire cross-section area of the void into which the epoxy resin composition in the molten state flows. In this case, the flowability (conductance) of the epoxy resin composition in the molten state becomes low, and thus the filling pressure needs to be increased for pouring the required amount of epoxy resin composition, which may damage the elements inside the cavity portion.

Therefore, in the present embodiment, the cross-section area of such a narrow portion is gradually reduced from the upstream side toward the downstream side in the direction of filling the cavity portion with the epoxy resin composition in the molten state. Accordingly, in the narrow portion, the shear rate generated in the epoxy resin composition gradually increases according to the distance from the gate portion filled with the epoxy resin composition in the molten state, so that the viscosity of the epoxy resin composition becomes lower. Therefore, although there is a partial increase in pressure, a long and narrow portion or the like can be easily filled with the epoxy resin composition in the molten state. Note that, since curing of the epoxy resin composition is caused by chemical change, parameters such as molding temperature and filling pressure are generally determined based on designs and experiments, along with the shape of the formed material, its accuracy, etc.

(Configuration of the Liquid Ejection Chip)

Figure 7B:
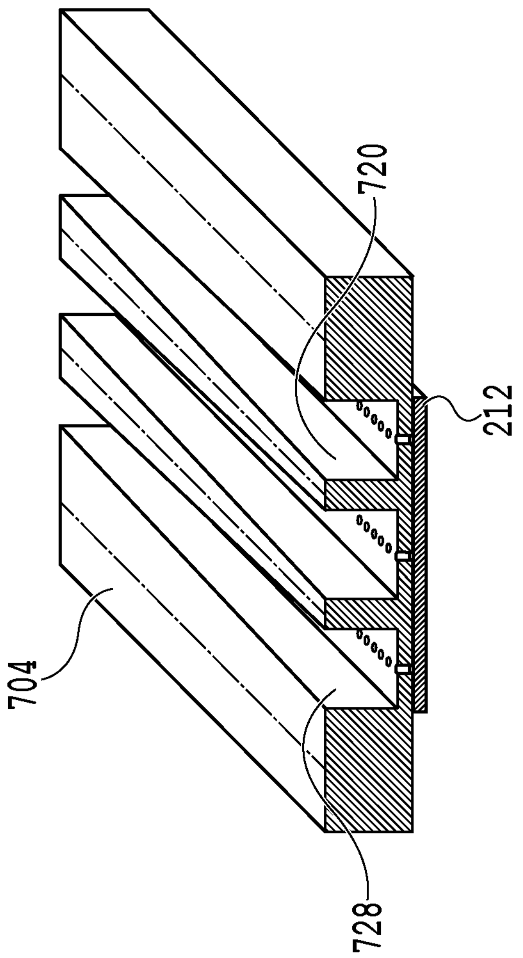
FIG. 7A and FIG. 7B are schematic configuration diagrams of a silicon substrate according to another embodiment.
Figure 7A:
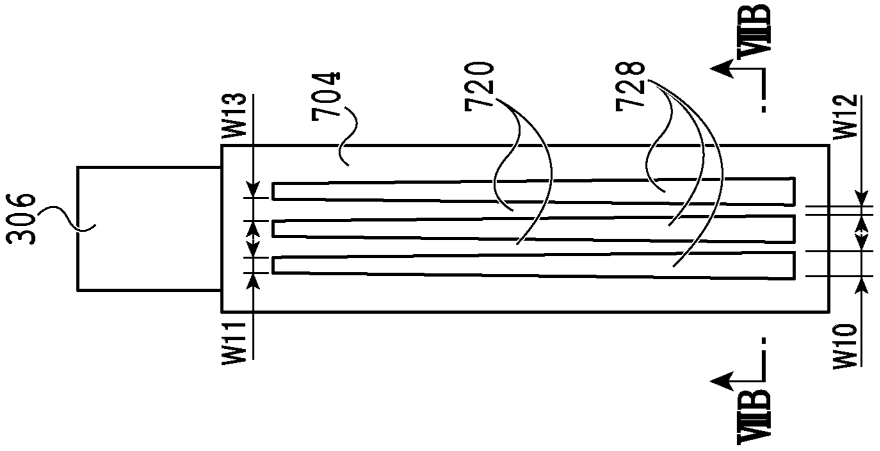

With reference to FIG. 7A and FIG. 7B, an explanation is given of the silicon substrate configuring the liquid ejection chip in the present embodiment. FIG. 7A and FIG. 7B are schematic configuration diagrams of the silicon substrate configuring the liquid ejection chip of the present embodiment. Further, FIG. 7A is a bottom face view, and FIG. 7B is a perspective view of the cross section taken along the line VIIB-VIIB of FIG. 7A.

In the silicon substrate 704 used for the liquid ejection chip 200 according to the present embodiment, the ejection port forming layer 212 and the wiring substrate 206 are attached to one surface, and the grooves 728 are installed so as to extend along the extending direction of the silicon substrate 704 on the other surface. The grooves 728 are formed so that, in the extending direction of silicon substrate 704, their widths gradually narrow from one side toward the other side where wiring substrate 206 is located. On the other hand, the protrusions 720 separating the spaces within the grooves 728 are formed so that their widths gradually widen from one side toward the other side in the extending direction of the silicon substrate 704.

For example, the grooves 728 have the width W10 of 0.6 mm at one end portion and the width W11 of 0.45 mm at the other end portion. Further, the protrusions 720 have the width W12 of 0.2 mm at one end portion and the width W13 of 0.35 mm at the other end portion, for example. That is, in the present embodiment, the width of the grooves 728 and the width of the protrusions 720 at one end portion are the same as the width of the grooves 228 and the width of the protrusions 220 of the above-described first embodiment, respectively. Further, the depth of the grooves 728 and the height of the protrusions 720 are set to 0.4 mm, which is the same as the grooves 228 and the protrusions 220 in the first embodiment.

(Procedure for Producing the Liquid Ejection Chip Using the Transfer Molding Method)

Figure 8A:
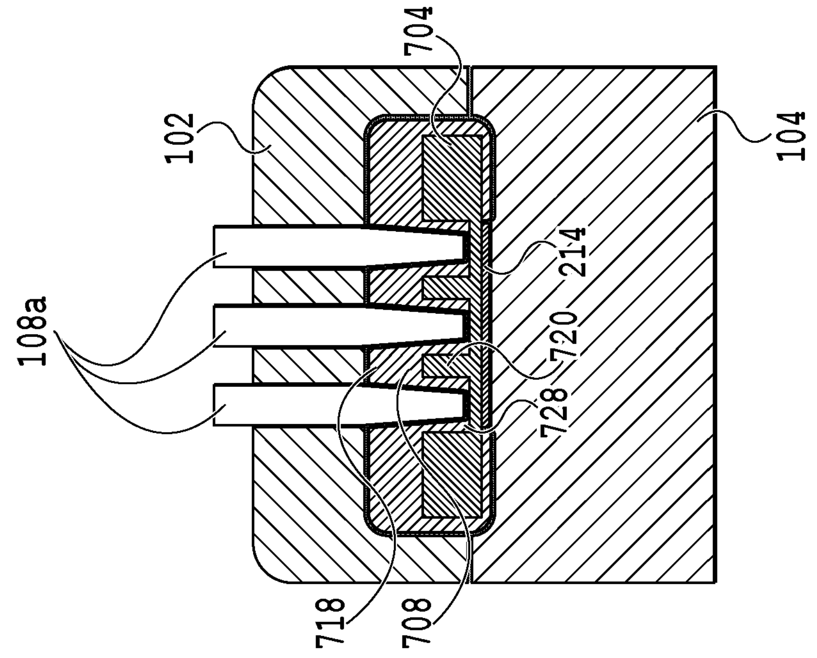
FIG. 8A to FIG. 8B are diagrams for explaining the production of a liquid ejection chip using the silicon substrate of FIG. 7A and FIG. 7B.
Figure 8B:
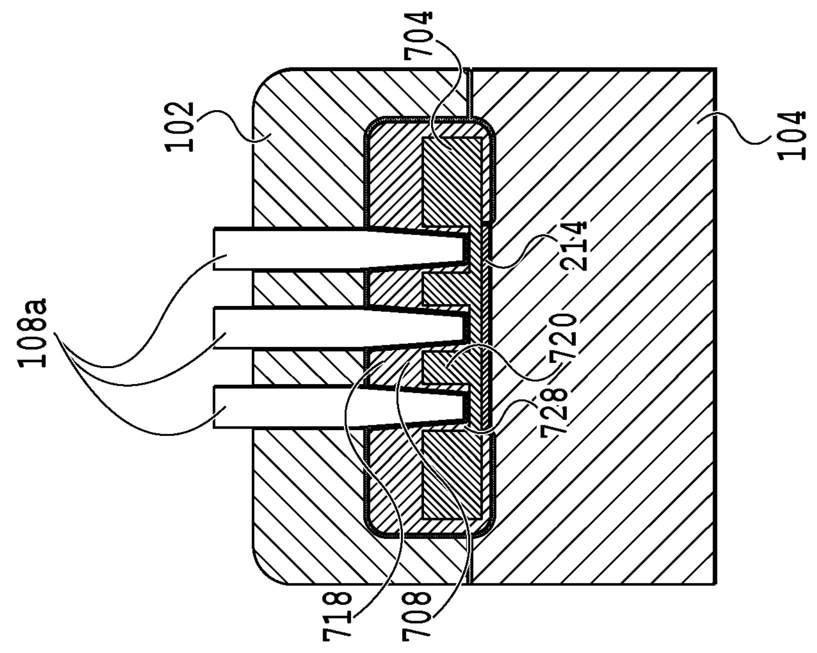

Next, with reference to FIG. 4A, FIG. 4B, FIG. 4C, FIG. 4D, FIG. 8A, and FIG. 8B, an explanation is given of the procedure for producing the liquid ejection chip 200. FIG. 8A and FIG. 8B are end face views of the end portions of the grooves 728 at the time of filling of the molten resin. Further, FIG. 8A is a cross-sectional view of one end portions of the grooves 728, and FIG. 8B is a cross-sectional view of the other end portions of the grooves 728. Note that the procedure for producing the liquid ejection chip 200 according to the present embodiment is the same as that of the above-described first embodiment, except that the silicon substrate loaded into the cavity portion 120 is different. Therefore, in the following explanation, detailed explanations are given of the differences attributed by the different silicon substrate.

The silicon substrate 704 is loaded into the setting portion 110 (see FIG. 4A), and the upper mold 102 and the lower mold 104 are fastened (see FIG. 4B). Then, the bottom faces of the grooves 728 of the silicon substrate 704 are pressed by the insert molds 108*a*, and the wiring substrate 206 is pressed by the insert mold 108*b*. Here, in the silicon substrate 704 loaded into the cavity portion 120, the one side to which the wiring substrate 206 is not attached is located on the gate portion 122 side. Note that, as described above, the width of the grooves 728 installed in the silicon substrate 704 gradually narrows from one side to the other side. Therefore, in the cavity portion 120, the width of the grooves 728 narrows with distance from the gate portion 122 side.

Thereafter, the upper mold 102, the lower mold 104, and the plunger 116 are heated to 180° C., so as to fill the cavity portion 120 with the molten resin 118' (see FIG. 4D). Here, within the cavity portion 120, the width of the grooves 728 decreases from the upstream side toward the downstream side in the direction in which the molten resin 118' flows, i.e., the filling direction. Therefore, in the state where the insert molds 108*a* press the bottom faces of the grooves 728, the void between the protrusions 720 and the insert molds 108*a* gradually becomes smaller from the upstream side toward the downstream side in the above-described filling direction.

By the way, as described above, the epoxy resin composition used in the present embodiment has a low viscosity in a molten state and exhibits a characteristic that the viscosity decreases with increase in shear rate. Further, in the configuration of the present embodiment, the void between the protrusions 720 and the insert molds 108*a* becomes smaller from the upstream side toward the downstream side in the filling direction, and the shear rate generated in the molten resin gradually increases in the void. Therefore, the viscosity of the molten resin decreases with advance toward the other side of the grooves on which the void becomes smaller, so that the molten resin easily flows.

Specifically, as illustrated in FIG. 8A and FIG. 8B, in the present embodiment, the partitions 718 formed by the protrusions 720 and the resin member 708 made of the molten resin 118' have a cross section in a trapezoidal shape with the base width of 0.5 mm, the upper width of 0.35 mm, and the height of 1.2 mm. Therefore, the cross-section area of the partitions 718 in the cross sections orthogonal to the extending direction is 0.51 $mm^2$.

Here, since the protrusions 720 corresponding to the partitions 718 located at one end parts of the grooves 728 have a width of 0.2 mm and a height of 0.4 mm, the cross-section area of the protrusions 720 at the one end parts is 0.08 $mm^2$ (see FIG. 8A). Therefore, in the partitions 718 located at one end parts of the grooves 728, the area filled with the molten resin 118' is 0.43 $mm^2$. Further, since the protrusions 720 corresponding to the partitions 718 located at the other end parts of the grooves 728 have a width of 0.35 mm and a height of 0.4 mm, the cross-section area of the protrusions 720 at the other end parts is 0.14 $mm^2$ (see FIG. 8B). Therefore, in the partitions 718 located at the other end parts of the grooves 728, the area filled with the molten resin 118' is 0.37 $mm^2$.

Thus, the cross-section areas of the regions into which the molten resin 118' flows to configure the partitions 718 decrease by about 14% from one end parts of the grooves 728 toward the other end parts. Note that, since the change in shear rate also depends on the resistance of the walls in contact and the total cross-section area, the change is not simply inversely proportional. However, when a similar sample was actually produced, with the partitions 718 in which the cross-section areas of the regions into which the molten resin 118' flows gradually decrease, it was confirmed that the fillable length increases by about 5%, compared to the partitions 718 in which the cross-section areas do not change. Further, even when the overall design was optimized in consideration of the shape, resin flow, accuracy, curing time period, etc., it was possible to form long partitions without increasing the cost.

Thereafter, if the filling of the cavity portion 120 with the molten resin 118' is completed, the molten resin 118' is cured over a time period of about 70 seconds while maintaining the temperature at 180° C., and then the fastening of the upper mold 102 and the lower mold 104 is released so that the formed material M is taken out.

As explained above, the present embodiment is configured so that the widths of the grooves 728 installed in the silicon substrate 704 gradually narrow and the widths of the protrusions 720 gradually widen from the upstream side toward the downstream side in the filling direction of the molten resin 118'. Accordingly, at the time of filling the cavity portion 120 with the molten resin 118', the shear rate generated in the molten resin 118' flowing into the void between the insert molds 108*a* and the protrusions 720 increases with distance from the gate portion 122. Therefore, in the present embodiment, in addition to the effects of the above-described first embodiment, the molten resin 118' can easily flow into the other end part side of the partitions 718, which is away from the gate portion 122, so as to properly mold the liquid ejection chip 200.

Other Embodiments

Note that the above-described embodiments may be modified as shown in the following (1) through (4).

Figure 9A:
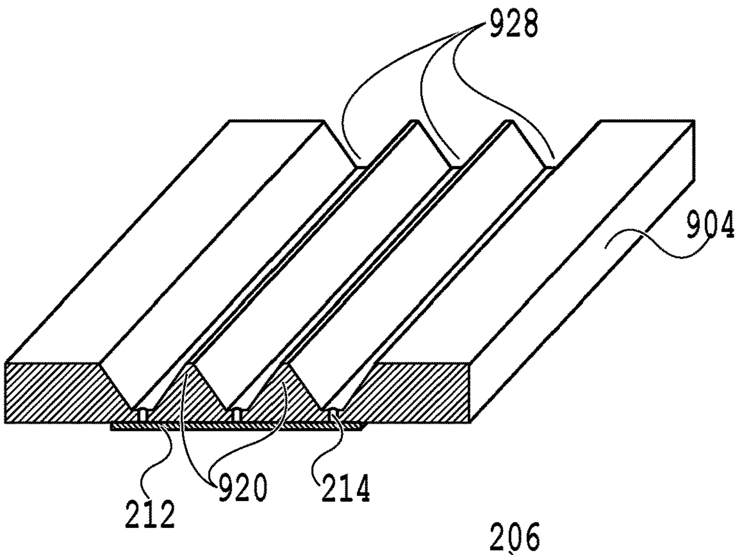
FIG. 9A to FIG. 9C are schematic configuration diagrams of a modification example of the silicon substrate.
Figure 9B:
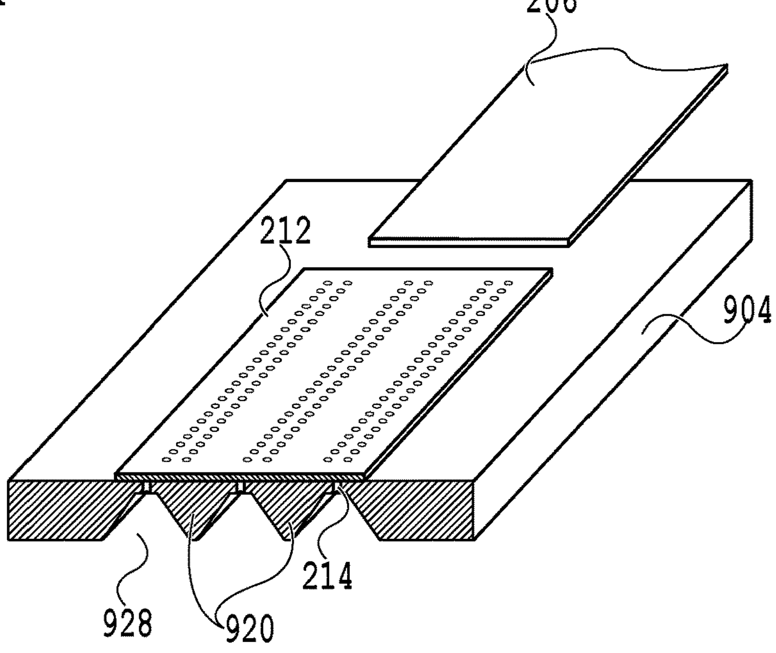
Figure 9C:
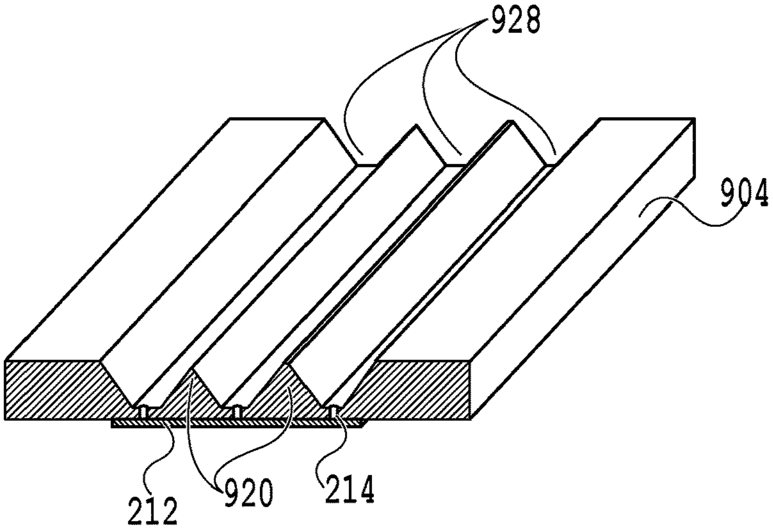
Figure 10B:
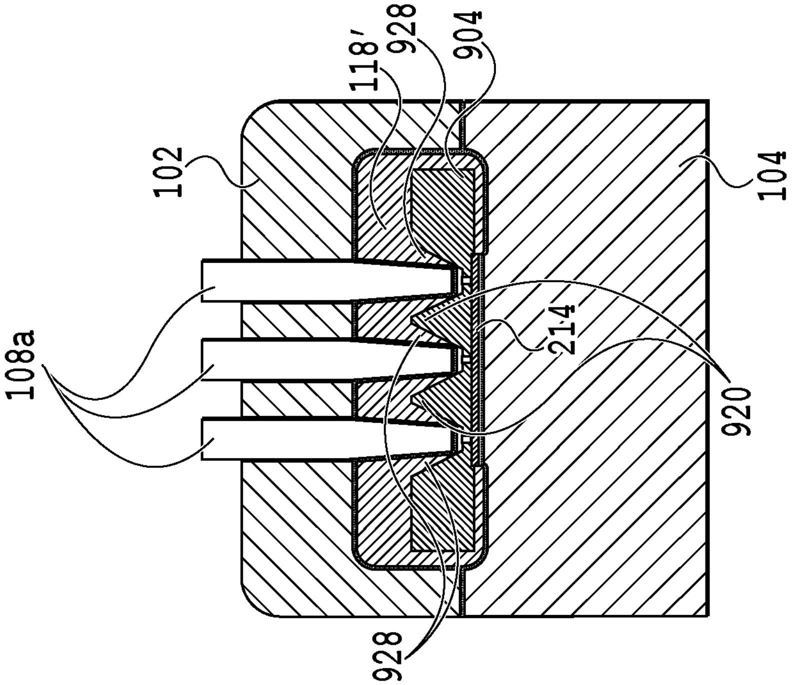
FIG. 10A and FIG. 10B are diagrams for explaining the production of the liquid ejection chip using the silicon substrate of FIG. 9A to FIG. 9D.
Figure 10A:
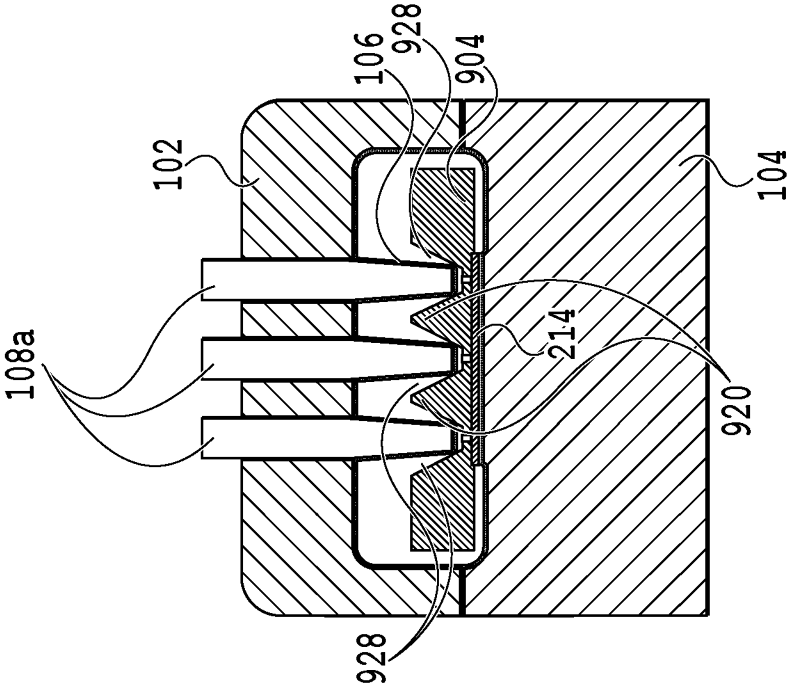

(1) In the above-described first embodiment, although the protrusions 220 have a rectangular cross section, there is not a limitation as such. It is also possible that the protrusions 220 have an approximately triangular cross section formed by a difference in chemical etching rates of a silicon crystal in plane orientations, for example. FIGS. 9A and 9B are diagrams illustrating a silicon substrate equipped with protrusions whose cross sections are approximately triangular, and FIG. 9C is a diagram illustrating a silicon substrate in which adjacent protrusions have different sizes. FIG. 10A is a diagram illustrating a state in which insert molds press a silicon substrate equipped with protrusions whose cross sections are approximately triangular. FIG. 10B is a drawing illustrating a state in which the cavity portion of FIG. 10A is filled with a molten resin.

The silicon substrate 904 equipped with the protrusions 920 whose cross sections are approximately triangular, which is illustrated in FIG. 9A, is obtained by performing wet etching to the silicon substrate with tetramethylammonium hydroxide (TMAH), for example. In the silicon substrate 904, the other surface on which the protrusions 920 are formed is the silicon plane (100), and the plane (111) having a slow etching rate appears as slopes at an angle of 55° from the plane (100), so that the protrusions 920 and the grooves 928 are formed. The ejection port forming layer 212 and the wiring substrate 206 are attached to the silicon substrate 904 on one surface opposite to the other surface on which the protrusions 920 are formed (see FIG. 9B).

In the silicon substrate 904, the widths of the bottom faces of the grooves 928 in which the supply ports 214 are formed are narrower than the widths of the tips of the insert molds 108*a*. Therefore, at the time of pressing the silicon substrate 904 with the insert molds 108*a* at the time of the transfer molding, the tips of the insert molds 108*a* are pressed against the slopes of the protrusions 920 or the like via the film 106 (see FIG. 10A). Note that the film 106 is elastically deformable. Therefore, in the state where the insert molds 108*a* are pressed against the slopes of the protrusions 920 or the like, the regions surrounded by the slopes, the bottom faces of the grooves 928, and the insert molds 108*a* are closed off from the space of the cavity portion 120 communicating with the gate portion 122. Therefore, even if the filling with the molten resin 118' is performed in this state, the region is not filled with the molten resin 118' (see FIG. 10B). As a result, the regions including the bottom faces of the grooves 928 where the supply ports 214 are formed and parts of the slopes of the partitions 918 are sealed with the film 106.

Note that, in wet etching, the etching rate may partially change. Therefore, for example, as in FIG. 9C, the adjacent protrusions 920 may have different heights and shapes. Even in such a case, by the pressing with the insert molds 108*a*, the tips of the insert molds 108*a* can be brought into contact with the slopes of the protrusions 920 or the like, and thus it is possible to obtain the same effect as in the case where the adjacent protrusions 920 have the same shape.

(2) Although the above-described second embodiment is formed so that the grooves 728 gradually narrow and the protrusions 720 gradually widen from one side toward the other side in order to increase the shear rate generated in the molten resin in the void between the insert molds 108*a* and the protrusions 720, there is not a limitation as such. That is, it is also possible that the widths of the grooves 728 and the protrusions 720 are constant and the widths of the insert molds 108*a* widen from one side toward the other side. Accordingly, the void between the insert molds 108*a* and the protrusions 720 gradually narrow from one side toward the other side.

(3) In the above-described embodiments, although the liquid ejection chip 200 is produced by the transfer molding in which a tablet is molten to form a molten resin in the mold 100 and curing is performed after the cavity portion 120 is filled with this molten resin, there is not a limitation as such. That is, the formation of the molten resin and the curing of the molten resin may be performed by different methods.

(4) The above-described embodiments and various forms shown in (1) through (3) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-129342, filed Aug. 15, 2022, which is hereby incorporated by reference wherein in its entirety.

What is claimed is:

1. A method for manufacturing a liquid ejection chip equipped with an ejection unit which is configured to be capable of ejecting a plurality of liquids, and a plurality of channels which are configured to separately store the plurality of liquids to be supplied to the ejection unit, the method comprising:

filling a molten resin into a mold into which a substrate in which the ejection unit is installed on a first surface and a groove and a protrusion for forming the channels are formed on a second surface is loaded, and curing the molten resin, thereby forming a resin member on the protrusion with the molten resin, the resin member forming a partition separating a space within the channels adjacent to each other, wherein the partition extends in a filling direction of the molten resin, and wherein a cross-section area of the resin member corresponding to the partition at a cross section orthogonal to an extending direction of the partition decreases from an upstream side toward a downstream side of the filling direction.

2. The method for manufacturing the liquid ejection chip according to claim 1, wherein the substrate is loaded into a void portion formed inside the mold, and wherein, in the mold, the molten resin is made by melting a loaded resin, and, after the void portion is filled with the molten resin, the molten resin is cured.

3. The method for manufacturing the liquid ejection chip according to claim 1, wherein a width of the protrusion widens from the upstream side toward the downstream side of the filling direction, so that the cross-section area decreases from the upstream side toward the downstream side in the filling direction.

4. The method for manufacturing the liquid ejection chip according to claim 1, wherein the mold is equipped with a pressing portion configured to press a bottom face of the groove, and wherein a width of the pressing part widens from the upstream side toward the downstream side of the filling direction, so that the cross-section decreases from the upstream side toward the downstream side of the filling direction.

5. The method for manufacturing the liquid ejection chip according to claim 1, wherein a cross section of the protrusion is rectangular or approximately triangular.

6. The method for manufacturing the liquid ejection chip according to claim 1, wherein the molten resin is a molten epoxy resin composition.

7. A liquid ejection chip in which an ejection port that ejects a plurality of liquids is formed on one surface and a partition configuring a plurality of channels that store the plurality of liquids to be supplied to the ejection port is formed on a side opposite to that of the one surface, wherein the partition is configured by adjoining a protrusion part of a substrate and a resin, wherein, in the partition, a distance of a joint portion in which the resin and the substrate are adjoined to each other is longer than a straight line connecting both edges of the joint portion, and wherein a cross-section area of the partition at a cross section orthogonal to an extending direction of the partition decreases in the extending direction of the partition.

8. The liquid ejection chip according to claim 7, wherein the protrusion part is installed so as to extend in a first direction on the substrate and widen in a second direction, which intersects the first direction, gradually from one side toward the other side of the first direction.

* * * * *